(12) United States Patent
Dai (10) Patent No.: US 12,189,598 B2
(45) Date of Patent: Jan. 7, 2025

(54) WRITING GRAPH DATA (71) Applicant: Alipay (Hangzhou) Information Technology Co., Ltd., Zhejiang (CN)

(72) Inventor: Kaihang Dai, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/390,739

(22) Filed: Dec. 20, 2023

(65) Prior Publication Data

US 2024/0119039 A1   Apr. 11, 2024

Related U.S. Application Data (63) Continuation of application No. PCT/CN2022/125736, filed on Oct. 17, 2022.

(30) Foreign Application Priority Data

Oct. 21, 2021 (CN) .......................... 202111224487.8

(51) Int. Cl.
G06F 16/22    (2019.01)
(52) U.S. Cl.
CPC ............................. *G06F 16/2272* (2019.01)
(58) Field of Classification Search
None
See application file for complete search history.

(56) References Cited

U.S. PATENT DOCUMENTS 11,093,497 B1\*   8/2021   Gupta ................ G06F 16/2343
2010/0242043 A1   9/2010   Shorb
2011/0246503 A1\* 10/2011   Bender .................. G06F 9/546
                                                        707/769

(Continued)

FOREIGN PATENT DOCUMENTS

CN   103886109   6/2014
CN   106354729   1/2017

(Continued)

OTHER PUBLICATIONS

International Preliminary Report on Patentability in International Appln. No. PCT/CN2022/125736, mailed on May 2, 2024, 12 pages (with English translation).

(Continued)

*Primary Examiner* — Yu Zhao
(74) *Attorney, Agent, or Firm* — Fish & Richardson P.C.

(57) ABSTRACT

Methods, computer-readable media and apparatuses are disclosed for graph data write. In an example, in response to receiving a first graph data write request, row lock indexes of corresponding row locks of target write objects are determined based on object identification information of the target write objects in the first graph data write request, where each target write object corresponds to a row lock. The target write objects are locked based on the row lock indexes of the target write objects; graph data write is performed for the first graph data write request after the target write objects are locked; the row locks held by the first graph data write request are unlocked after graph data of the target write objects is written; and a graph data write result is provided to a user after all the row locks held by the first graph data write request are unlocked.

20 Claims, 7 Drawing Sheets (56) References Cited

U.S. PATENT DOCUMENTS

2019/0303410 A1  10/2019  Beaumont et al.

FOREIGN PATENT DOCUMENTS

| CN | 108595251 | 9/2018 |
| CN | 108959403 | 12/2018 |
| CN | 110730958 | 1/2020 |
| CN | 112084206 | 12/2020 |
| CN | 113672636 | 11/2021 |

OTHER PUBLICATIONS

International Search Report and Written Opinion in International Appln. No. PCT/CN2022/125736, mailed on Jan. 5, 2023, 15 pages (with English translation).

Mao et al., "Relative position optimism locking mechanism and its application in collaborative editing," Journal of Computer-Aided Design and Graphics, Sep. 30, 2004, p. 1307-1312 (with English Abstract only).

Xie et al., "High-performance Acid via modular concurrency control," In Proceedings of the 25th Symposium on Operating Systems Principles, Oct. 31, 2015, p. 279-294.

* cited by examiner

WRITING GRAPH DATA

CROSS-REFERENCE TO RELATED APPLICATIONS

This application is a continuation of PCT Application No. PCT/CN2022/125736, filed on Oct. 17, 2022, which claims priority to Chinese Patent Application No. 202111224487.8, filed on Oct. 21, 2021, and each application is hereby incorporated by reference in its entirety.

TECHNICAL FIELD

Embodiments of this specification generally relate to the database field, and in particular, to graph data write methods and apparatuses.

BACKGROUND

When vertex/edge data is written into a graph database, to ensure data accuracy, a corresponding data resource needs to be locked, and the data resource is unlocked after writing is completed. According to this graph data write method, when hot data is written into the graph database, most write threads in a thread pool in the graph database are blocked, which causes data write to be blocked, and consequently, overall write TPS (Transactions Per Second) of the graph database is greatly reduced. In addition, because of mutual exclusion between locks, hot data write requests cannot be executed concurrently. As a result, write TPS of the hot data is relatively low, and a write size of the hot data cannot be matched. As a result, a large quantity of hot data write requests fail or time out.

SUMMARY

In view of the above, embodiments of this specification provide graph data write methods and apparatuses. According to the graph data write methods and apparatuses, a finer-grained row lock structure is disposed for each vertex or edge in graph data to reduce lock contention during vertex/edge write, thereby improving overall write TPS of a graph database. In addition, because a specified row lock can be added or deleted automatically, the row lock can be managed dynamically, so that less memory can be used to cover and protect an ultra-large-scale of graph data.

According to an aspect of the embodiments of this specification, a graph data write method is provided, including following: In response to receiving a first graph data write request initiated by a user, row lock indexes of corresponding row locks of target write objects are determined based on object identification information of the target write objects in the first graph data write request, where the target write object includes a target write vertex and/or a target write edge, and each target write object corresponds to a row lock; the target write objects in the first graph data write request are locked based on the row lock indexes of the target write objects; graph data write is performed for the first graph data write request after the target write objects in the first graph data request are locked; the row locks held by the first graph data write request are unlocked after graph data of the target write objects in the first graph data write request is written; and a graph data write result is provided to the user after all the row locks held by the first graph data write request are unlocked.

Optionally, in an example of the above-mentioned aspect, that the target write objects in the first graph data write request are locked based on the row lock indexes of the target write objects can include following: A locking sequence of the target write objects is determined based on the row lock indexes of the target write objects in the first graph data write request; and the target write objects in the first graph data write request are locked based on the determined locking sequence, and locked row lock information is recorded in a write request record, where the row lock information includes at least a row lock index of a row lock.

Optionally, in an example of the above-mentioned aspect, that the target write objects in the first graph data write request are locked based on the determined locking sequence can include following: The following locking process is iteratively performed for the first graph data write request until the target write objects are locked or the first graph data write request is put in a row lock wait list: sequentially extracting a target write object not locked currently from the first graph data write request based on the determined locking sequence; querying, for the extracted target write object based on the row lock index of the target write object, whether a corresponding row lock exists in a latch that includes the row lock index; and creating a row lock for the extracted target write object in the latch that includes the row lock index when the corresponding row lock does not exist in the latch that includes the row lock index; or putting the first graph data write request in a row lock wait list of the row lock when the corresponding row lock exists in the latch that includes the row lock index.

Optionally, in an example of the above-mentioned aspect, that the row locks held by the first graph data write request are unlocked after graph data of the target write objects in the first graph data write request is written can include following: The following unlocking process is iteratively performed for the first graph data write request until all the row locks held by the first graph data write request are unlocked: extracting unlocked row lock information from the write request record of the first graph data write request; querying, based on a row lock index in the extracted row lock information, whether a graph data write request to be written exists in a corresponding row lock wait list; and transferring an ownership of a row lock corresponding to the row lock index to a second graph data write request located at a head of the row lock wait list when the graph data write request to be written exists in the row lock wait list; or deleting the row lock corresponding to the row lock index from a latch that includes the row lock index when the second graph data write request to be written does not exist in the row lock wait list.

Optionally, in an example of the above-mentioned aspect, the graph data write method can further include following: An asynchronous retry of the second graph data write request is triggered to perform graph data write for the second graph data write request.

Optionally, in an example of the above-mentioned aspect, the graph data write method can further include following: A row lock wait list that includes the second graph data write request is accessed in response to that the asynchronous retry of the second graph data write request is triggered, to determine whether a third graph data write request that can be combined for processing exists in the row lock wait list; and the second graph data write request and the third graph data write request are combined into a new graph data write request to write graph data when the third graph data write request that can be combined for processing exists in the row lock wait list.

Optionally, in an example of the above-mentioned aspect, when graph data write is performed for the second graph data write request or the combined new graph data write request, a target write object that has been locked in the second graph data write request or the new graph data write request does not need to be locked again.

According to another aspect of the embodiments of this specification, a graph data write apparatus is provided, including: a row lock index determining unit, configured to determine, in response to receiving a first graph data write request initiated by a user, row lock indexes of corresponding row locks of target write objects based on object identification information of the target write objects in the first graph data write request, where the target write object includes a target write vertex and/or a target write edge, and each target write object corresponds to a row lock; a locking unit, configured to lock the target write objects in the first graph data write request based on the row lock indexes of the target write objects; a data write unit, configured to perform graph data write for the first graph data write request after the target write objects in the first graph data write request are locked; an unlocking unit, configured to unlock the row locks held by the first graph data write request after graph data of the target write objects in the first graph data write request is written; and a write result providing unit, configured to provide a graph data write result to the user after all the row locks held by the first graph data write request are unlocked.

Optionally, in an example of the above-mentioned aspect, the locking unit can include: a locking sequence determining module, configured to determine a locking sequence of the target write objects based on the row lock indexes of the target write objects in the first graph data write request; a locking module, configured to lock the target write objects in the first graph data write request based on the determined locking sequence; and a locking information recording module, configured to record locked row lock information in a write request record, where the row lock information includes at least a row lock index of a row lock.

Optionally, in an example of the above-mentioned aspect, the locking module iteratively performs the following locking process for the first graph data write request until the target write objects are locked or the first graph data write request is put in a row lock wait list: sequentially extracting a target write object not locked currently from the first graph data write request based on the determined locking sequence; querying, for the extracted target write object based on the row lock index of the target write object, whether a corresponding row lock exists in a latch that includes the row lock index; and creating a row lock for the extracted target write object in the latch that includes the row lock index when the corresponding row lock does not exist in the latch that includes the row lock index; or putting the first graph data write request in a row lock wait list of the row lock when the corresponding row lock exists in the latch that includes the row lock index.

Optionally, in an example of the above-mentioned aspect, the unlocking unit iteratively performs the following unlocking process for the first graph data write request until all the row locks held by the first graph data write request are unlocked: extracting unlocked row lock information from the write request record of the first graph data write request; querying, based on a row lock index in the extracted row lock information, whether a graph data write request to be written exists in a corresponding row lock wait list; and transferring an ownership of a row lock corresponding to the row lock index to a second graph data write request located at a head of the row lock wait list when the graph data write request to be written exists in the row lock wait list; or deleting the row lock corresponding to the row lock index from a latch that includes the row lock index when the graph data write request to be written does not exist in the row lock wait list.

Optionally, in an example of the above-mentioned aspect, the graph data write apparatus can further include an asynchronous retry triggering unit, configured to trigger an asynchronous retry of the second graph data write request to perform graph data write for the second graph data write request.

Optionally, in an example of the above-mentioned aspect, the graph data write apparatus can further include: a combinable write request determining unit, configured to access a row lock wait list that includes the second graph data write request in response to that the asynchronous retry of the second graph data write request is triggered, to determine whether a third graph data write request that can be combined for processing exists in the row lock wait list; and a write request combining unit, configured to combine the second graph data write request and the third graph data write request into a new graph data write request to write graph data when the third graph data write request that can be combined for processing exists in the row lock wait list.

According to another aspect of the embodiments of this specification, a graph data write apparatus is provided, including: at least one processor; a storage coupled to the at least one processor; and a computer program stored in the storage, where the at least one processor executes the computer program to implement the graph data write method described above.

According to another aspect of the embodiments of this specification, a computer-readable storage medium is provided. The computer-readable storage medium stores executable instructions, and when the instructions are executed, a processor is enabled to perform the graph data write method described above.

According to another aspect of the embodiments of this specification, a computer program product is provided, including a computer program, where the computer program is executed by a processor to implement the graph data write method described above.

BRIEF DESCRIPTION OF DRAWINGS

The essence and advantages of this specification can be further understood by referring to the following accompanying drawings. In the accompanying drawings, similar components or features can have the same reference numerals.

DESCRIPTION OF EMBODIMENTS

The subject matter described in this specification will be discussed now with reference to example implementations. It should be understood that these implementations are merely discussed to enable a person skilled in the art to better understand and implement the subject matter described in this specification, and is not intended to limit the protection scope, applicability, or examples described in the claims. Functions and arrangements of elements under discussion can be changed without departing from the protection scope of this specification. In the examples, various processes or components can be omitted, replaced, or added as needed. For example, the described method can be performed in a sequence different from the described sequence, and the steps can be added, omitted, or combined. In addition, features described in some examples can also be combined in other examples.

As used in this specification, the term "include" and its variant represent open terms, meaning "including but not limited to". The term "based on" represents "at least partially based on". The terms "one embodiment" and "an embodiment" represent "at least one embodiment". The term "another embodiment" represents "at least one other embodiment". The terms "first", "second", etc. can refer to different objects or the same object. Other definitions, whether explicit or implicit, can be included below. Unless explicitly stated in the context, the definition of a term is consistent throughout this specification.

Graph data includes vertex data and edge data. The vertex data can include, for example, a vertex identifier and a vertex attribute. In an example, the vertex identifier can include a vertex ID and a vertex type. In another example, the vertex identifier can include a vertex ID. The vertex identifier is used to uniquely identify a vertex in the graph data. The edge data can include an edge identifier and an edge attribute. The edge identifier can include a source ID, an edge type, an edge timestamp, and a destination ID. The vertex identifier, the edge identifier, the vertex attribute, and the edge attribute can be related to a service. For example, in a social network scenario, the vertex ID can be a person's identity card number, a person number, etc. The vertex type can be a category of a vertex, for example, the vertex is classified as a user-type vertex. The vertex attribute can include age, educational background, address, occupation, etc. The edge type is used to indicate a type of an edge. For example, if a transfer edge is created between vertex A and vertex B, the edge type of the transfer edge can be "transfer". The edge attribute can include an attribute of an edge formed between vertices. For example, in the above transfer edge, the edge attribute can include "amount", "currency", "operating device", etc. The term "vertex" can also be referred to as a graph node. In this specification, the vertex data can be referred to as vertex information, and the edge data can be referred to as edge information.

In this specification, the term "hot data" can refer to a vertex, an edge, or a subgraph in a graph database that is frequently updated in unit time. The term "row lock" can refer to a fine-grained lock used to protect data resources, and each vertex or edge corresponds to a row lock. The term "row lock wait list" is used to represent a list created in a row lock to store graph data write requests that have a lock conflict.

When the vertex/edge data is written into the graph database, to ensure data accuracy, corresponding data resources need to be locked, and the data resources are unlocked after the graph data is written. In an application scenario of the graph data, there are vertices with a large quantity of associated edges, for example, Weibo influencers and leading e-commerce merchants. In some scenarios, these vertices receive a large quantity of concurrent write requests instantaneously, and therefore become hot data. When a vertex in the graph data becomes hot data, only one write thread in all corresponding concurrent write threads can hold a resource lock of the vertex, and other write threads need to wait for the lock to be released before being locked and written one by one. It can be seen that, in a hot data scenario, most write threads in a thread pool in the graph database are blocked, and consequently, most data write is blocked, resulting in a significant decrease in overall write TPS of the graph database. In addition, the hot data is a large quantity of instantaneous concurrent write requests, and locks of these write requests are mutually exclusive. As a result, the hot data write requests cannot be executed concurrently, write TPS of the hot data is relatively low, and a write scale of the hot data cannot be matched, and consequently, a large quantity of hot data write requests fail or time out.

In view of this, embodiments of this specification provide a graph data write solution. In the graph data write solution, in a latch created during initialization of a graph database, a finer-grained row lock structure is disposed for each vertex or each edge in graph data, and each row lock is unique in the latch, to reduce lock contention during vertex/edge write when graph data is written, thereby improving overall write TPS of the graph database. In addition, the row lock in each latch can be added or deleted. The row lock is created during locking and the row lock is released during unlocking, to dynamically manage the row lock, thereby fully utilizing memory space, so that less memory can be used to cover and protect an ultra-large-scale of graph data.

A graph data write method and a graph data write apparatus according to the embodiments of this specification are described below with reference to the accompanying drawings.

Figure 1:
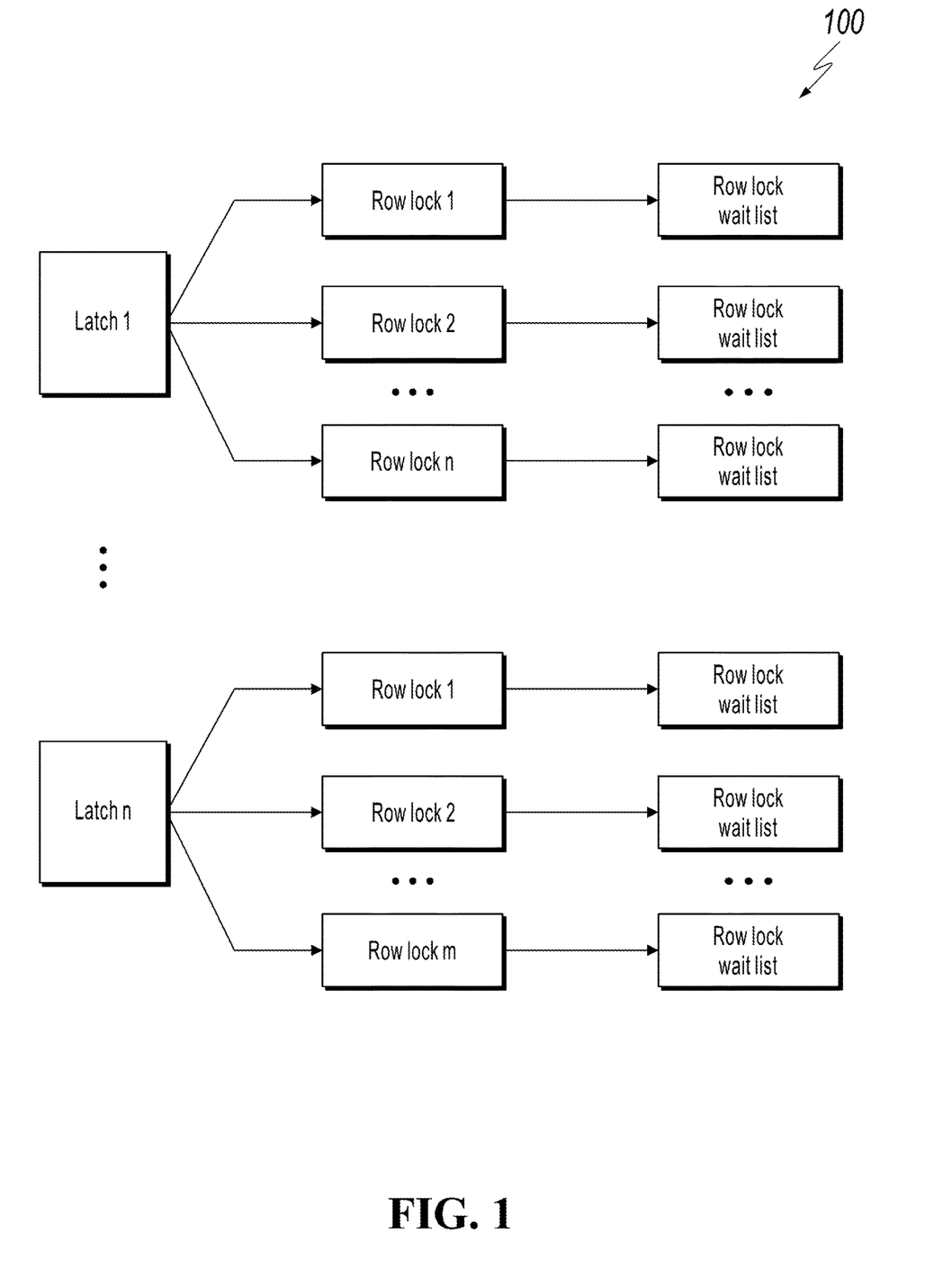
FIG. 1 is an example schematic diagram illustrating a lock structure in a graph database, according to one or more embodiments of this specification.

FIG. 1 is an example schematic diagram illustrating a lock structure 100 in a graph database, according to one or more embodiments of this specification.

As shown in FIG. 1, the lock structure 100 includes a plurality of latches, each latch has a plurality of row locks, and a row lock wait list is created in each row lock. The latch is created during initialization of a graph database to provide critical protection for the row lock in the latch. When a locking/unlocking operation is performed on a row lock, a latch that includes the row lock needs to be locked. The lock structure 100 has a fixed quantity of latches, but a quantity of row locks in each latch is not fixed. For a latch, a row lock can be created when a target write object is locked, and the row lock can be released (deleted) when the target write object is unlocked. A wait list can be created in the row lock to store graph data write requests that have a lock conflict.

Figure 2:
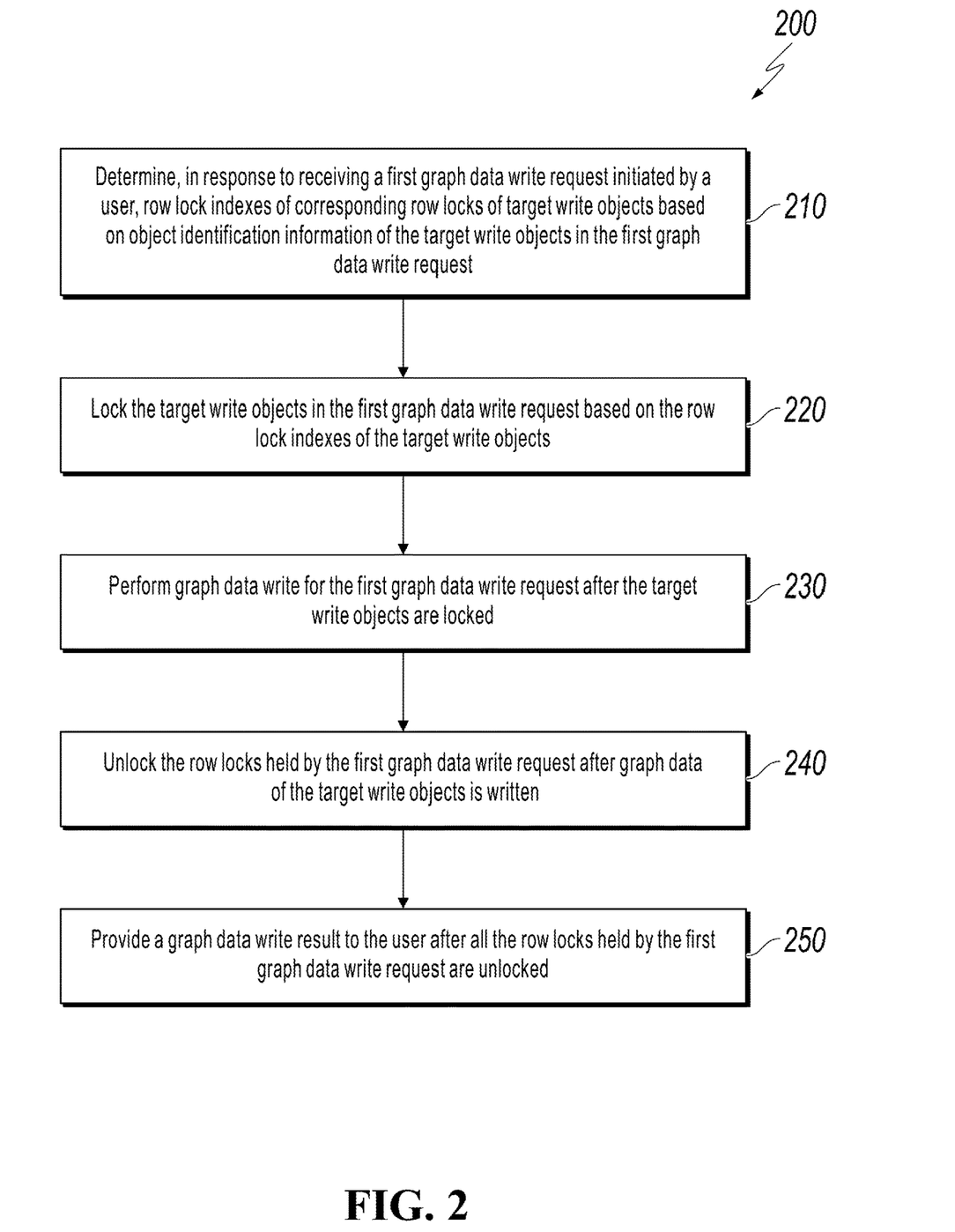
FIG. 2 is an example flowchart illustrating a graph data write method, according to one or more embodiments of this specification.

FIG. 2 is an example flowchart illustrating a graph data write method 200, according to one or more embodiments of this specification.

As shown in FIG. 2, in step 210, in response to receiving a first graph data write request initiated by a user, row lock indexes of corresponding row locks of target write objects are determined based on object identification information of the target write objects in the first graph data write request, where the target write object includes a target write vertex and/or a target write edge, and each target write object corresponds to a row lock. For example, when the target write object is a target write vertex, the object identification information is a vertex identifier of the target write vertex, for example, a vertex ID and a vertex type. When the target write object is a target write edge, the object identification information is an edge identifier of the target write edge, for example, a source ID, an edge type, a timestamp, and a destination ID.

For example, when the target write object is a vertex, a row lock index of a corresponding row lock can be calculated based on a vertex identifier (for example, a vertex ID and a vertex type). When the target write object is an edge, a row lock index of a corresponding row lock can be calculated based on an edge identifier (for example, a source ID, an edge type, an edge timestamp, and a destination ID). In an example, the row lock index can be determined by calculating a hash value. For example, the row lock index is determined by calculating a hash value of the object identification information of the target write object by using a hash algorithm. Examples of the hash algorithm can include but are not limited to a consistent hash algorithm or a perfect hash algorithm.

In this specification, the term "consistent hash algorithm" refers to a common hash algorithm. For any given data, the same hash calculation result is obtained regardless of how many times of consistent hash calculation. In addition, a hash collision may occur in the consistent hash calculation. In other words, for two given data, hash calculation results obtained after the consistent hash calculation may be the same.

The term "perfect hash algorithm" means that for any data in a given range, perfect hash values obtained after perfect hash calculation are different, so that the perfect hash value can be used to uniquely map the data. When the perfect hash calculation is performed, a perfect hash factor needs to be determined based on the data in the given range in a process of the perfect hash calculation, and each data or a plurality of data can correspond to one perfect hash factor. When the perfect hash calculation is performed on the data by using the perfect hash algorithm, it can be ensured that a perfect hash value obtained for the data in the given range is a unique value. Here, the uniqueness of the perfect hash value is specific for the data in the given range, and a hash value obtained based on data beyond the given range may be the same as the perfect hash value corresponding to the data in the given range.

In step 220, the target write objects in the first graph data write request are locked based on the row lock indexes of the target write objects.

Figure 3:
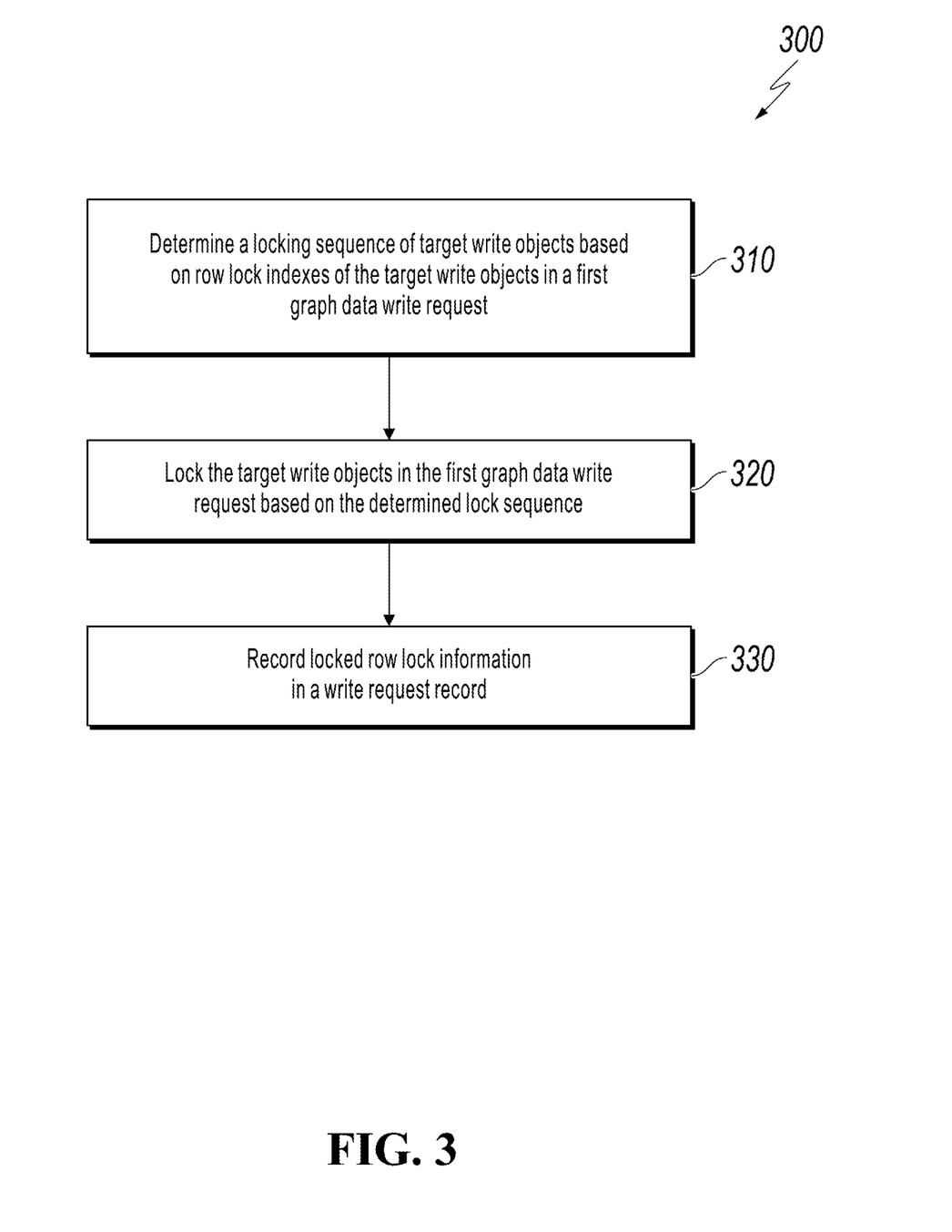
FIG. 3 is an example flowchart illustrating a write object locking process, according to one or more embodiments of this specification.

FIG. 3 is an example flowchart illustrating a write object locking process 300, according to one or more embodiments of this specification.

As shown in FIG. 3, in step 310, a locking sequence of the target write objects is determined based on the row lock indexes of the target write objects in the first graph data write request. For example, locking sorting can be performed the target write objects based on index values of row lock indexes determined through hash calculation.

Specifically, for example, for a vertex, a row lock index of the vertex is obtained by performing hash calculation on a vertex ID and a vertex type, that is, RowIndex=hash (id, type). For an edge, a row lock index of the edge is obtained by performing hash calculation on a source id (srcid), an edge type (type), an edge timestamp (timestamp), and a destination ID (dstid), that is, RowIndex=hash (srcid, type, timestamp, dstid). After the row lock index RowIndex of the target write object is determined, a modulo operation is performed on the RowIndex by using a LatchSize as a modulus, to obtain a LatchIndex of a latch that includes the RowIndex.

During locking sorting, sorting is first performed based on the LatchIndex of the latch that includes the RowIndex. Next, for RowIndexes with the same LatchIndex, sorting is performed based on the RowIndexes. For example, assume that for target write objects A, B, C, and D, <LatchIndex, RowIndex> obtained through the above-mentioned calculation are respectively <1, 6>, <2, 4>, <1, 5>, and <2, 3>, a locking sequence of the target write objects A, B, C, and D is <C, A, D, B>.

In step 320, the target write objects in the first graph data write request are locked based on the determined locking sequence. When row lock locking processing is performed, the latch can be obtained based on the LatchIndex, and the obtained latch is locked. A process of locking the target write objects in the first graph data write request is an iterative process that is performed in sequence.

Figure 4:
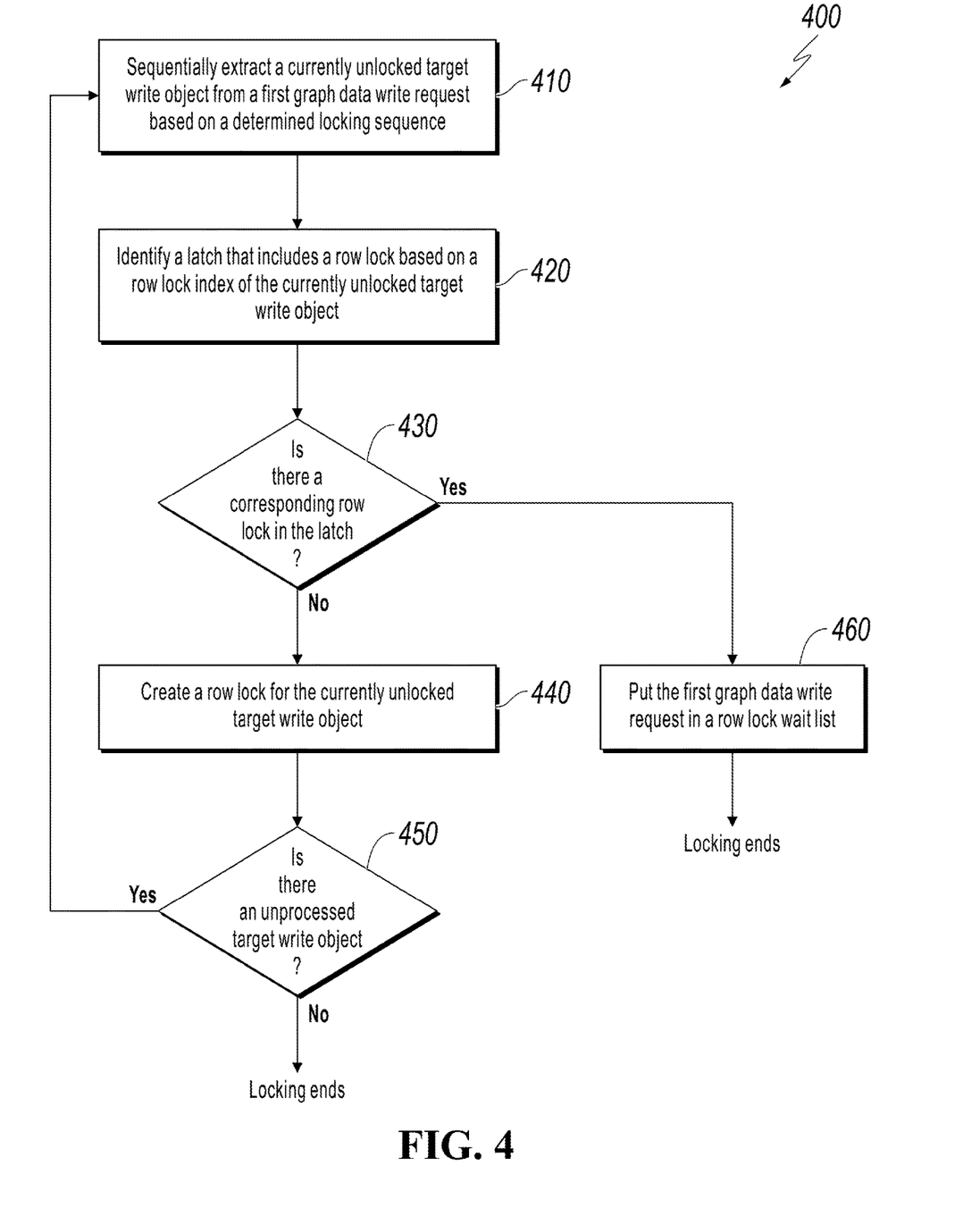
FIG. 4 is an example flowchart illustrating a process of sequentially locking write objects, according to one or more embodiments of this specification.

FIG. 4 is an example flowchart illustrating a process 400 of sequentially locking write objects, according to one or more embodiments of this specification.

As shown in FIG. 4, in step 410, a target write object not locked currently is sequentially extracted from the first graph data write request based on the determined locking sequence.

Whether a corresponding row lock exists in a latch that includes the row lock index is queried for the extracted target write object based on the row lock index of the target write object. Specifically, in step 420, a latch that includes the row lock index RowIndex of the target write object is identified based on the row lock index. For example, a LatchIndex is obtained by performing a modulo operation on the RowIndex by using a LatchSize as a modulus, and then the latch that includes the RowIndex is identified based on the LatchIndex. After the latch that includes the RowIndex is identified, in step 430, whether a corresponding row lock exists in the latch is queried based on the row lock index RowIndex.

If the corresponding row lock does not exist in the latch that includes the row lock index, in step 440, a row lock is created for the extracted target write object in the latch that includes the row lock index, thereby locking the target write object. Then, the procedure proceeds to step 450. In step 450, it is determined whether a target write object that does not undergo locking processing exists in the first graph data write request. If the target write object that does not undergo locking processing exists, the procedure returns to step 410 to perform a locking processing process for a next target write object. If the target write object that does not undergo locking processing does not exist, the locking processing process for the first graph data write request ends.

When the corresponding row lock exists in the latch that includes the row lock index, at 460, the first graph data write request is put in a row lock wait list of the row lock, and the locking processing process for the first graph data write request ends.

Returning to FIG. 3, after the locking processing process for the first graph data write request is completed, in step 330, locked row lock information is recorded in a write request record, where the recorded row lock information includes at least a row lock index RowIndex of a row lock. Optionally, in an example, the recorded row lock information can further include a LatchIndex of a latch that includes the row lock. It is worthwhile to note that in other embodiments, the operation in step 330 can be performed immediately after step 440 in FIG. 4, that is, each time a target write object is locked, corresponding row lock information is recorded in the write request record.

After locking processing for the first graph data write request is completed, in step 230, graph data write is performed for the first graph data write request. Here, a graph data write process can be implemented in any applicable data write way in the art, and details are omitted here for simplicity.

After graph data of the target write objects in the first graph data write request is written, in step 240, the row locks held by the first graph data write request are unlocked. A process of unlocking the row locks held by the first graph data write request is an iterative processing process performed until all the row locks held by the first graph data write request are unlocked.

Figure 5:
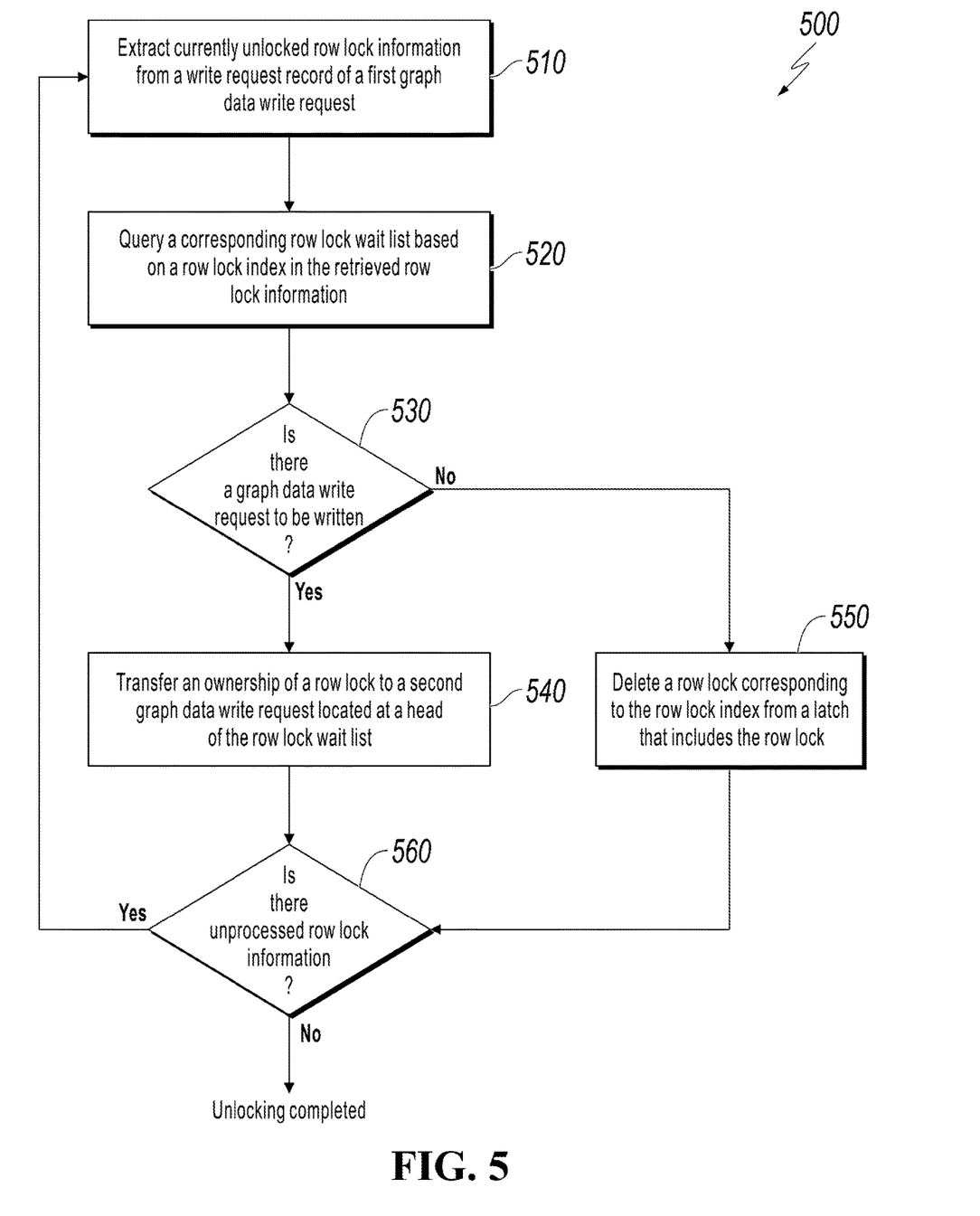
FIG. 5 is an example flowchart illustrating a row lock unlocking process, according to one or more embodiments of this specification.

FIG. 5 is an example flowchart illustrating a row lock unlocking process 500, according to one or more embodiments of this specification.

As shown in FIG. 5, in each iteration, in step 510, unlocked row lock information is extracted from the write request record of the first graph data write request.

In step 520, a corresponding row lock wait list is queried based on a row lock index in the extracted row lock information, and in step 530, it is determined whether a graph data write request to be written exists in the corresponding row lock wait list.

If the graph data write request to be written exists in the row lock wait list, in step 540, an ownership of a row lock corresponding to the row lock index is transferred to a second graph data write request located at a head of the row lock wait list, thereby unlocking the row lock and the first graph data write request. Then, the procedure proceeds to 560.

If the second graph data write request to be written does not exist in the row lock wait list, in step 550, the row lock corresponding to the row lock index is deleted from a latch that includes the row lock index, thereby unlocking the row lock. Then, the procedure proceeds to 560.

In step 560, it is determined whether unprocessed row lock information exists in the write request record. If the unprocessed row lock information exists, the procedure returns to step 510 to perform row lock unlocking processing for a next row of row lock information. If the unprocessed row lock information does not exist, row lock unlocking processing for the first graph data write request is completed.

In an example, the row lock information in the write request record can further include a latch index of a latch that includes a row lock. In this case, when the row lock corresponding to the row lock index is unlocked, a latch (that is, a latch that includes the row lock) indexed by a latch index can be locked.

Optionally, in an example, after the ownership of the row lock corresponding to the row lock index is transferred to the second graph data write request located at a head of the row lock wait list, an asynchronous retry of the second graph data write request can be further triggered to perform a graph data write process for the second graph data write request. The graph data write process for the second graph data write request can be performed in the same way as the graph data write process for the first graph data write request.

Optionally, in an example, after the asynchronous retry of the second graph data write request is triggered, a row lock wait list that includes the second graph data write request can be further accessed, to determine whether a third graph data write request that can be combined for processing exists in the row lock wait list. If the third graph data write request that can be combined for processing exists in the row lock wait list, the second graph data write request and the third graph data write request are combined into a new graph data write request. Then, graph data is written based on the new graph data write request.

Optionally, in an example, when graph data write is performed for the second graph data write request or the new graph data write request, a target write object that has been locked in the second graph data write request or the new graph data write request does not need to be locked again.

Returning to FIG. 2, after all the row locks held by the first graph data write request are unlocked, a graph data write result is provided to the user in step 250. In this specification, examples of the graph data write result can include but are not limited to: a graph data write success, a graph data write failure (add the reason for failure), a graph data write timeout, etc.

It is worthwhile to note that, when a graph data write includes a plurality of graph data write requests, the above-mentioned graph data write method can be performed in parallel for the plurality of graph data write requests.

The following describes the graph data write process according to the embodiments of this specification by using an example. In the example, a graph data write apparatus simultaneously receives three graph data write requests: write request 1, write request 2, and write request 3, where write request 1 includes three target write vertices <D, B, C>, write request 2 includes three target write vertices <E, F, C>, and write request 1 includes three target write vertices <A, C, G>.

When writing graph data, the graph data write apparatus concurrently executes write request 1, write request 2, and write request 3. First, the graph data write apparatus separately calculates RowIndexes of row locks corresponding to vertices based on vertex information in write request 1, write request 2, and write request 3, and performs locking sorting based on the RowIndexes. For example, a RowIndex and a locking sequence of write request 1 are <RowIndex_B, RowIndex_C, RowIndex_D>, a RowIndex and a locking sequence of write request 2 are <RowIndex_C, RowIndex_E, RowIndex_F>, and a RowIndex and a locking sequence of write request 3 are <RowIndex_A, RowIndex_C, RowIndex_G>.

The three write requests concurrently lock vertices in the locking sequences respectively determined for the three write requests. Assume that write request 2 first successfully locks vertex C, locking processes of the three write requests are as follows.

Write request 1 first calculates a corresponding LatchIndex based on RowIndex_B, and therefore identifies a corresponding latch. In this case, there is no row_lock_B corresponding to vertex B in the latch, so that row_lock_B is created in the latch, and vertex B is successfully locked. Then, locking processing is performed for vertex C. When locking processing is performed for vertex C, because row_lock_C (created by write request 2) already exists in a corresponding latch, write request 1 is put in a wait list of row_lock_C to wait for release of row_lock_C.

Write request 2 sequentially locks vertices C, E, and F based on locking sequences of the vertices C, E, and F, and after the locking succeeds, a graph data write operation is performed.

Write request 3 first calculates a corresponding LatchIndex based on RowIndex_A, and therefore identifies a corresponding latch. In this case, there is no row_lock_A corresponding to vertex A in the latch, so that row_lock_A is created in the latch, and vertex A is successfully locked. Then, locking processing is performed for vertex C. When locking processing is performed for vertex C, because row_lock_C (created by write request 2) already exists in a corresponding latch, write request 3 is put in a wait list of row_lock_C to wait for release of row_lock_C.

After completing a graph data write operation, the write request 2 starts to perform an unlocking operation. During the unlocking operation, row_lock_C is released first. When row_lock_C is released, it is found that write request 1 and write request 3 exist in the wait list of row_lock_C, and write request 1 ranks at a list head of the wait list. In this case, an ownership of row_lock_C is transferred to write request 1, and an asynchronous retry of write request 1 is triggered, so that row_lock_C is released for write request 2. Subsequently, row_lock_E and row_lock_F are sequentially released. Because wait lists of row_lock_E and row_lock_F have no write request to be written, row_lock_E and row_lock_F are deleted from a latch that includes row_lock_E and row_lock_F.

During the asynchronous retry of write request 1, whether the wait list of row_lock_C has a write request that can be combined with write request 1 is first checked. For example, if it is found that write request 3 that can be combined with write request 1, write request 1 and write request 3 are combined into a new write request 4<A, B, C, D, G>, and then graph data write is performed for write request 4. A graph data write process for write request 4 is the same as the graph data write process for write request 2.

Specifically, row lock indexes RowIndex_A, RowIndex_B, RowIndex_C, RowIndex_D, and RowIndex_G of five vertices A, B, C, D, and Gin write request 4 are calculated, and a locking sequence <RowIndex_A, RowIndex_B, RowIndex_C, RowIndex_D, RowIndex_G> is determined. Then, the vertices A, B, C, D, and G are sequentially locked in the above-mentioned locking sequence. In an example, because the vertices A, B, and C have been locked, when locking processing for write request 4 is performed, the vertices A, B, and C may no longer be locked, and only the vertices D and G not locked are sequentially locked. After the locking succeeds, a subsequent graph data write operation is performed for write request 4.

After the graph data write for write request 4 is completed, the row locks row_lock_A, row_lock_B, row_lock_C, row_lock_D, and row_lock_G are released and deleted. Then, graph data write results of write request 1 and write request 2 are returned.

The graph data write method according to the embodiments of this specification is described above with reference to FIG. 1 to FIG. 5.

According to the above-mentioned graph data write method, in a latch created during initialization of a graph database, a finer-grained row lock structure is disposed for each vertex or each edge in graph data to replace an original bucket lock structure, and each row lock is unique in the latch and corresponds to a unique vertex or edge, so that a lock conflict occurs only at the same vertex or on the same edge when the graph data is written, thereby reducing lock contention during vertex/edge write, and improving overall write TPS of the graph database. In addition, the row lock in each latch can be added or deleted, to dynamically manage the row lock, thereby fully utilizing memory space, so that less memory can be used to cover and protect an ultra-large-scale of graph data.

According to the above-mentioned graph data write method, a row lock wait list is created in each row lock to store graph data write requests that have a lock conflict, so that a lock conflict caused by hot data no longer blocks other write threads in a thread pool in the graph database, thereby greatly improving overall write TPS of the graph database when the hot data exists.

According to the above-mentioned graph data write method, when the asynchronous retry of the second graph data write request is triggered, another combinable graph data write request in a row lock wait list can be combined, to resolve a problem that write TPS is low because hot data write requests cannot be executed concurrently.

Figure 6:
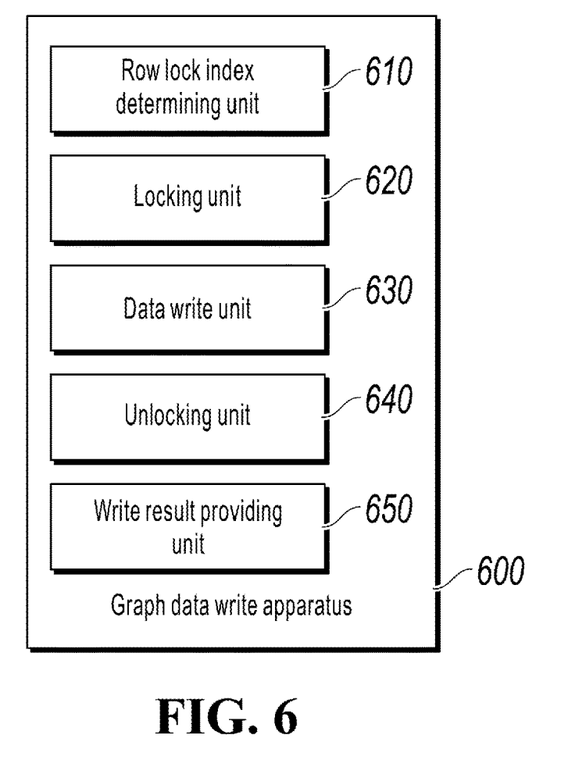
FIG. 6 is an example block diagram illustrating a graph data write apparatus, according to one or more embodiments of this specification.

FIG. 6 is an example block diagram illustrating a graph data write apparatus 600, according to one or more embodiments of this specification. As shown in FIG. 6, the graph data write apparatus 600 can include a row lock index determining unit 610, a locking unit 620, a data write unit 630, an unlocking unit 640, and a write result providing unit 650.

The row lock index determining unit 610 is configured to determine, in response to receiving a first graph data write request initiated by a user, row lock indexes of corresponding row locks of target write objects based on object identification information of the target write objects in the first graph data write request, wherein the target write object includes a target write vertex and/or a target write edge, and each target write object corresponds to a row lock. For the operation of the row lock index determining unit 610, references can be made to the operation described above with reference to step 210 in FIG. 2.

The locking unit 620 is configured to lock the target write objects in the first graph data write request based on the row lock indexes of the target write objects. For the operation of the locking unit 620, references can be made to the operation described above with reference to step 220 in FIG. 2 and the operations described above with reference to FIG. 3 and FIG. 4.

The data write unit 630 is configured to perform graph data write for the first graph data write request after the target write objects in the first graph data write request are locked. For the operation of the data write unit 630, references can be made to the operation described above with reference to step 230 in FIG. 2.

The unlocking unit 640 is configured to unlock the row locks held by the first graph data write request after graph data of the target write objects in the first graph data write request is written. For the operation of the unlocking unit 640, references can be made to the operation described above with reference to step 240 in FIG. 2 and the operations described with reference to FIG. 5.

The write result providing unit 650 is configured to provide a graph data write result to the user after all the row locks held in the first graph data write request are unlocked. For the operation of the write result providing unit 650, references can be made to the operation described above with reference to step 250 in FIG. 2.

Figure 7:
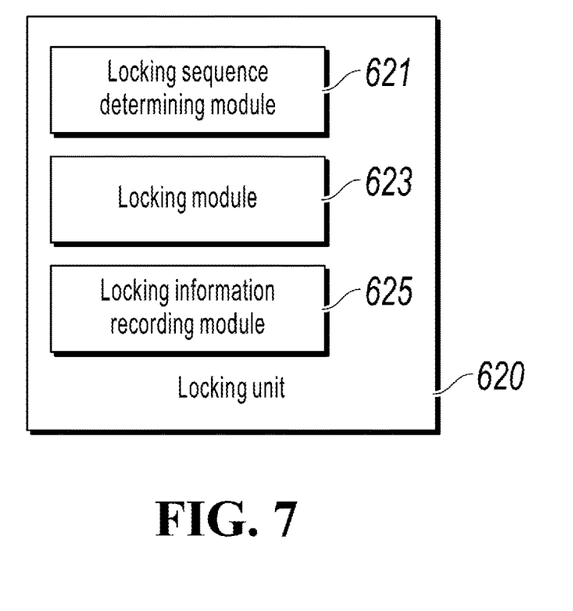
FIG. 7 is an example block diagram illustrating a locking unit, according to one or more embodiments of this specification.

FIG. 7 is an example block diagram illustrating the locking unit 620, according to one or more embodiments of this specification. As shown in FIG. 7, the locking unit 620 includes a locking sequence determining module 621, a locking module 623, and a locking information recording module 625.

The locking sequence determining module 621 is configured to determine a locking sequence of the target write objects based on the row lock indexes of the target write objects in the first graph data write request. For the operation of the locking sequence determining module 621, references can be made to the operation described above with reference to step 310 in FIG. 3.

The locking module 623 is configured to lock the target write objects in the first graph data write request based on the determined locking sequence. For the operation of the locking module 623, references can be made to the operation described above with reference to step 320 in FIG. 3 and the operations described with reference to FIG. 4.

The operation process of the locking module 623 is an iterative process. Specifically, the locking module 623 performs the following locking process for the first graph data write request loop until the target write objects are locked or the first graph data write request is put in a row lock wait list.

In each iteration, the locking module 623 sequentially extracts a target write object not locked currently from the first graph data write request based on the determined locking sequence, and queries, for the extracted target write object based on the row lock index of the target write object, whether a corresponding row lock exists in a latch that includes the row lock index. When the corresponding row lock does not exist in the latch that includes the row lock index, the locking module 623 creates a row lock for the extracted target write object in the latch that includes the row lock index. When the corresponding row lock exists in the latch that includes the row lock index, the locking module 623 puts the first graph data write request in a row lock wait list of the row lock.

The locking information recording module 625 is configured to record locked row lock information in a write request record, where the recorded the row lock information includes at least a row lock index of a row lock. For the operation of the locking information recording module 625, references can be made to the operation described above with reference to step 330 in FIG. 3.

The unlocking process performed by the unlocking unit 640 for the row locks held by the first graph data write request is an iterative processing process performed until all the row locks held by the first graph data write request are unlocked. Specifically, in each iteration, the unlocking unit 640 extracts unlocked row lock information from the write request record of the first graph data write request, and queries, based on a row lock index in the extracted row lock information, whether a graph data write request to be written exists in a corresponding row lock wait list. When the graph data write request to be written exists in the row lock wait list, the unlocking unit 640 transfers an ownership of a row lock corresponding to the row lock index to a second graph data write request located at a head of the row lock wait list. When the graph data write request to be written does not exist in the row lock wait list, the unlocking unit 640 deletes the row lock from a latch that includes the row lock corresponding to the row lock index.

In addition, optionally, in an example, the graph data write apparatus 600 can further include an asynchronous retry triggering unit (not shown). The asynchronous retry triggering unit triggers an asynchronous retry of the second graph data write request to perform a graph data write operation for the second graph data write request.

In addition, optionally, in an example, the graph data write apparatus 600 can further include a combinable write request determining unit and a write request combining unit. The combinable write request determining unit accesses a row lock wait list that includes the second graph data write request in response to that the asynchronous retry of the second graph data write request is triggered, to determine whether a third graph data write request that can be combined for processing exists in the row lock wait list. When the third graph data write request that can be combined for processing exists in the row lock wait list, the write request combining unit combines the second graph data write request and the third graph data write request into a new graph data write request to write graph data. Here, the third graph data write request can include one or more third graph data write requests.

The graph data write method and the graph data write apparatus according to the embodiments of this specification are described above with reference to FIG. 1 to FIG. 7. The previously described graph data write apparatus can be implemented by hardware, or can be implemented by software or a combination of hardware and software.

Figure 8:
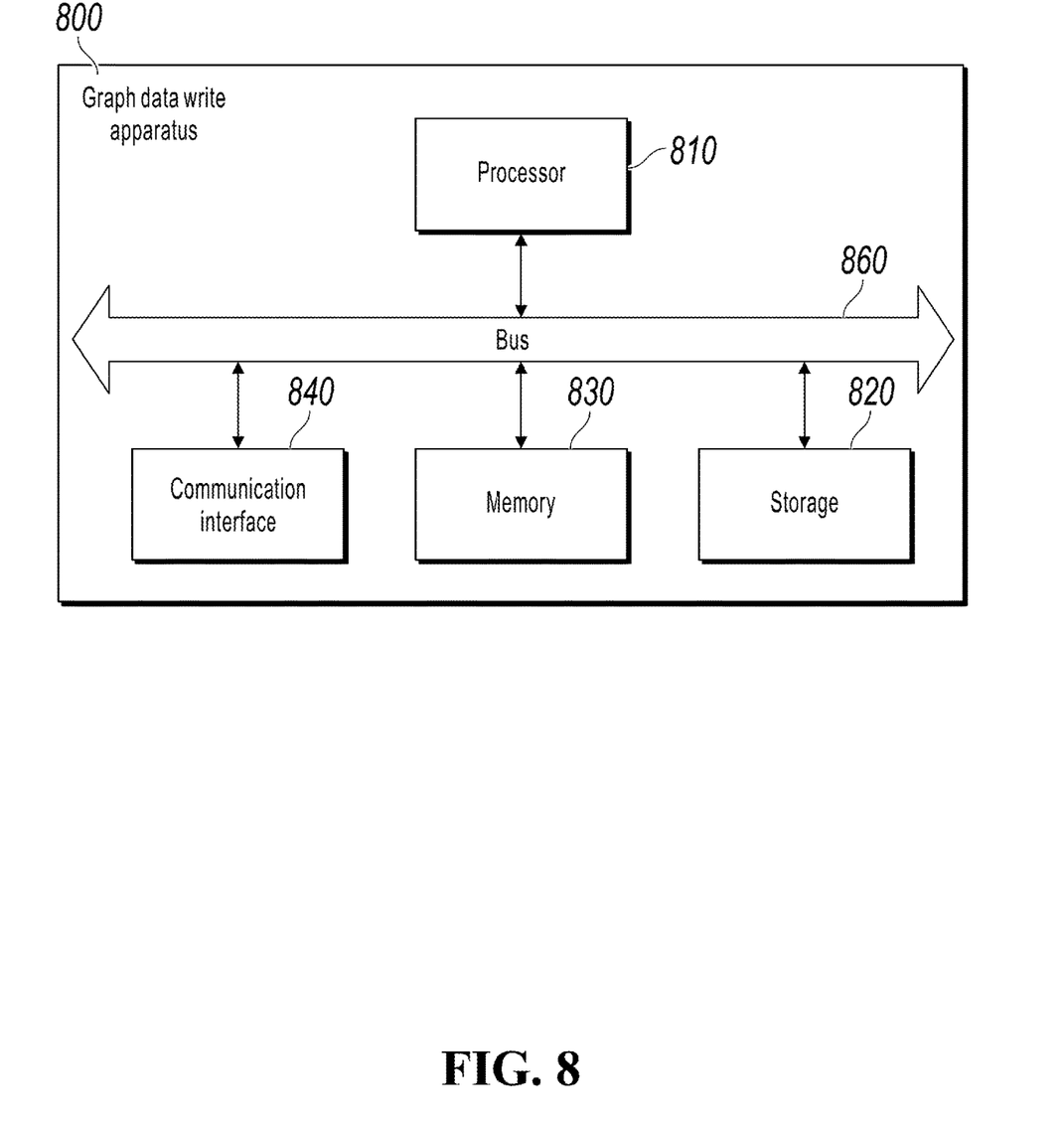
FIG. 8 is an example schematic diagram illustrating a graph data write apparatus implemented based on a computer system, according to one or more embodiments of this specification.

FIG. 8 is a schematic diagram illustrating a graph data write apparatus 800 implemented based on a computer system, according to one or more embodiments of this specification. As shown in FIG. 8, the graph data write apparatus 800 can include at least one processor 810, a storage (for example, a nonvolatile memory) 820, a memory 830, and a communication interface 840, and the at least one processor 810, the storage 820, the memory 830, and the communication interface 840 are connected together through a bus 860. The at least one processor 810 executes at least one computer-readable instruction (namely, the above-mentioned elements implemented in a software form) stored or encoded in the storage.

In one or more embodiments, computer-executable instructions are stored in the storage, and when the computer-executable instructions are executed, the at least one processor 810 is enabled to determine, in response to receiving a first graph data write request initiated by a user, row lock indexes of corresponding row locks of target write objects based on object identification information of the target write objects in the first graph data write request, wherein the target write object comprises a target write vertex and/or a target write edge, and each target write object corresponds to a row lock; lock the target write objects in the first graph data write request based on the row lock indexes of the target write objects; perform graph data write for the first graph data write request after the target write objects in the first graph data write request are locked; unlock the row locks held by the first graph data write request after graph data of the target write objects in the first graph data write request is written; and provide a graph data write result to the user after all the row locks held by the first graph data write request are unlocked.

It should be understood that, when the computer-executable instructions stored in the storage are executed, the at least one processor 810 is enabled to perform various operations and functions described above with reference to FIG. 1 to FIG. 7 in the embodiments of this specification.

According to one or more embodiments, a program product such as a machine-readable medium (for example, a non-transient machine-readable medium) is provided. The machine-readable medium can have instructions (namely, the above-mentioned elements implemented in a software form). When the instructions are executed by a machine, the machine is enabled to perform various operations and functions described above with reference to FIG. 1 to FIG. 7 in the embodiments of this specification. Specifically, a system or an apparatus equipped with a readable storage medium can be provided, and software program code for implementing the functions in any of the above-mentioned embodiments is stored in the readable storage medium, so that a computer or a processor of the system or the apparatus reads and executes instructions stored in the readable storage medium.

In this case, the program code read from the readable medium can implement the functions in any of the above-mentioned embodiments. Therefore, the machine-readable code and the readable storage medium that stores the machine-readable code form a part of this invention.

Embodiments of the readable storage medium include a floppy disk, a hard disk, a magneto-optical disk, an optical disc (such as a CD-ROM, a CD-R, a CD-RW, a DVD-ROM, a DVD-RAM, a DVD-RW, a DVD-RW), a magnetic tape, a non-volatile storage card, and a ROM. Alternatively, the program code can be downloaded from a server computer or a cloud by a communication network.

According to one or more embodiments, a computer program product is provided. The computer program product includes a computer program, and when the computer program is executed by a processor, the processor is enabled to perform various operations and functions described above with reference to FIG. 1 to FIG. 7 in the embodiments of this specification.

A person skilled in the art should understand that various variations and modifications can be made to the embodiments disclosed above without departing from the essence of the prevent invention. Therefore, the protection scope of this application shall be defined by the appended claims.

It is worthwhile to note that, not all the steps and units in the above-mentioned procedures and system structure diagrams are necessary, and some steps or units can be ignored based on an actual demand. An execution sequence of each step is not fixed, and can be determined based on a demand. The apparatus structure described in the above-mentioned embodiments can be a physical structure, or can be a logical structure. In other words, some units can be implemented by the same physical entity, or some units can be implemented by a plurality of physical entities or implemented jointly by some components in a plurality of independent devices.

In the previous embodiments, the hardware units or modules can be implemented mechanically or electrically. For example, a hardware unit, module, or processor can include a permanent dedicated circuit or logic (such as a specialized processor, an FPGA, or an ASIC) to complete corresponding operations. The hardware unit or processor can further include programmable logic or a programmable circuit (such as a general-purpose processor or another programmable processor), and can be set temporarily by software to complete corresponding operations. A specific implementation way (mechanical way, or a dedicated permanent circuit, or a temporarily arranged circuit) can be determined based on the consideration of costs and time.

The specific implementations illustrated above with reference to the accompanying drawings describe example embodiments, but do not represent all embodiments that can be implemented or fall within the protection scope of the claims. The term "example" used throughout this specification means "used as an example, an instance, or an illustration", but does not mean "preferred" or "advantageous" over other embodiments. For the purpose of providing an understanding of the described technologies, specific implementations include specific details. However, these technologies can be implemented without these specific details. In some instances, well-known structures and apparatuses are shown in block diagrams to avoid causing difficulties in understanding the concepts of the described embodiments.

The above-mentioned descriptions of this disclosure are provided to enable any person of ordinary skill in the art to implement or use this disclosure. Various modifications made to this disclosure are clear to a person of ordinary skill in the art, and the general principles defined in this specification can also be applied to other variants without departing from the protection scope of this disclosure. Therefore, this disclosure is not limited to the examples and designs described in this specification, but is consistent with the widest scope of principles and novel features that conform to this specification.

What is claimed is:

1. A computer-implemented method, comprising:
    determining, in response to receiving a first graph data write request initiated by a user, row lock indexes of corresponding row locks of target write objects based on object identification information of the target write objects in the first graph data write request, wherein the target write object comprises at least one of a target write vertex or a target write edge, and each target write object corresponds to a row lock;
    locking the target write objects in the first graph data write request based on the row lock indexes of the target write objects;
    performing graph data write for the first graph data write request after the target write objects in the first graph data write request are locked;
    unlocking the row locks held by the first graph data write request after graph data of the target write objects in the first graph data write request is written; and
    providing a graph data write result to the user after all the row locks held by the first graph data write request are unlocked.

2. The computer-implemented method according to claim 1, wherein the locking the target write objects in the first graph data write request based on the row lock indexes of the target write objects comprises:
    determining a locking sequence of the target write objects based on the row lock indexes of the target write objects in the first graph data write request;
    locking the target write objects in the first graph data write request based on the locking sequence; and
    recording locked row lock information in a write request record, wherein the locked row lock information comprises at least a row lock index of a row lock.

3. The computer-implemented method according to claim 2, wherein the locking the target write objects in the first graph data write request based on the locking sequence comprises:
    iteratively performing the following locking process for the first graph data write request until the target write objects are locked or the first graph data write request is put in a row lock wait list:
        sequentially extracting a target write object not currently locked from the first graph data write request based on the locking sequence;
        querying, for the target write object not currently locked based on the row lock index of the target write object, whether a corresponding row lock exists in a latch that comprises the row lock index; and creating a row lock for the target write object not currently locked in the latch that comprises the row lock index when the corresponding row lock does not exist in the latch that comprises the row lock index; or putting the first graph data write request in a row lock wait list of the row lock when the corresponding row lock exists in the latch that comprises the row lock index.

4. The computer-implemented method according to claim 2, wherein the unlocking the row locks held by the first graph data write request after graph data of the target write objects in the first graph data write request is written comprises:

iteratively performing the following unlocking process for the first graph data write request until all the row locks held by the first graph data write request are unlocked:

extracting unlocked row lock information from the write request record of the first graph data write request;

querying, based on a row lock index in the unlocked row lock information, whether a graph data write request to be written exists in a corresponding row lock wait list; and transferring an ownership of a row lock corresponding to the row lock index to a second graph data write request located at a head of the row lock wait list when the graph data write request to be written exists in the row lock wait list; or deleting the row lock corresponding to the row lock index from a latch that comprises the row lock index when the second graph data write request to be written does not exist in the row lock wait list.

5. The computer-implemented method according to claim 4, further comprising:

triggering an asynchronous retry of the second graph data write request to perform graph data write for the second graph data write request.

6. The computer-implemented method according to claim 5, further comprising:

accessing a row lock wait list that comprises the second graph data write request in response to that the asynchronous retry of the second graph data write request is triggered, to determine whether a third graph data write request that can be combined for processing exists in the row lock wait list; and combining the second graph data write request and the third graph data write request into a new graph data write request to write graph data when the third graph data write request that can be combined for processing exists in the row lock wait list.

7. The computer-implemented method according to claim 6, wherein when graph data write is performed for the new graph data write request, a target write object that has been locked in the new graph data write request is not locked again.

8. The computer-implemented method according to claim 5, wherein when graph data write is performed for the second graph data write request, a target write object that has been locked in the second graph data write request is not locked again.

9. A non-transitory, computer-readable medium storing one or more instructions executable by a computer system to perform operations comprising:

determining, in response to receiving a first graph data write request initiated by a user, row lock indexes of corresponding row locks of target write objects based on object identification information of the target write objects in the first graph data write request, wherein the target write object comprises at least one of a target write vertex or a target write edge, and each target write object corresponds to a row lock;

locking the target write objects in the first graph data write request based on the row lock indexes of the target write objects;

performing graph data write for the first graph data write request after the target write objects in the first graph data write request are locked;

unlocking the row locks held by the first graph data write request after graph data of the target write objects in the first graph data write request is written; and providing a graph data write result to the user after all the row locks held by the first graph data write request are unlocked.

10. The non-transitory, computer-readable medium according to claim 9, wherein the locking the target write objects in the first graph data write request based on the row lock indexes of the target write objects comprises:

determining a locking sequence of the target write objects based on the row lock indexes of the target write objects in the first graph data write request;

locking the target write objects in the first graph data write request based on the locking sequence; and recording locked row lock information in a write request record, wherein the locked row lock information comprises at least a row lock index of a row lock.

11. The non-transitory, computer-readable medium according to claim 10, wherein the locking the target write objects in the first graph data write request based on the locking sequence comprises:

iteratively performing the following locking process for the first graph data write request until the target write objects are locked or the first graph data write request is put in a row lock wait list:

sequentially extracting a target write object not currently locked from the first graph data write request based on the locking sequence;

querying, for the target write object not currently locked based on the row lock index of the target write object, whether a corresponding row lock exists in a latch that comprises the row lock index; and creating a row lock for the target write object not currently locked in the latch that comprises the row lock index when the corresponding row lock does not exist in the latch that comprises the row lock index; or putting the first graph data write request in a row lock wait list of the row lock when the corresponding row lock exists in the latch that comprises the row lock index.

12. The non-transitory, computer-readable medium according to claim 10, wherein the unlocking the row locks held by the first graph data write request after graph data of the target write objects in the first graph data write request is written comprises:

iteratively performing the following unlocking process for the first graph data write request until all the row locks held by the first graph data write request are unlocked:

extracting unlocked row lock information from the write request record of the first graph data write request;

querying, based on a row lock index in the unlocked row lock information, whether a graph data write request to be written exists in a corresponding row lock wait list; and transferring an ownership of a row lock corresponding to the row lock index to a second graph data write request located at a head of the row lock wait list when the graph data write request to be written exists in the row lock wait list; or deleting the row lock corresponding to the row lock index from a latch that comprises the row lock index when the second graph data write request to be written does not exist in the row lock wait list.

13. The non-transitory, computer-readable medium according to claim 12, wherein the operations further comprise:
triggering an asynchronous retry of the second graph data write request to perform graph data write for the second graph data write request.

14. The non-transitory, computer-readable medium according to claim 13, wherein the operations further comprise:
accessing a row lock wait list that comprises the second graph data write request in response to that the asynchronous retry of the second graph data write request is triggered, to determine whether a third graph data write request that can be combined for processing exists in the row lock wait list; and
combining the second graph data write request and the third graph data write request into a new graph data write request to write graph data when the third graph data write request that can be combined for processing exists in the row lock wait list.

15. An apparatus, comprising:
one or more processors; and
one or more memory devices interoperably coupled with the one or more processors and having tangible, non-transitory, machine-readable media storing one or more instructions that, when executed by the one or more processors, perform operations comprising:
determining, in response to receiving a first graph data write request initiated by a user, row lock indexes of corresponding row locks of target write objects based on object identification information of the target write objects in the first graph data write request, wherein the target write object comprises at least one of a target write vertex or a target write edge, and each target write object corresponds to a row lock;
locking the target write objects in the first graph data write request based on the row lock indexes of the target write objects;
performing graph data write for the first graph data write request after the target write objects in the first graph data write request are locked;
unlocking the row locks held by the first graph data write request after graph data of the target write objects in the first graph data write request is written; and
providing a graph data write result to the user after all the row locks held by the first graph data write request are unlocked.

16. The apparatus according to claim 15, wherein the locking the target write objects in the first graph data write request based on the row lock indexes of the target write objects comprises:
determining a locking sequence of the target write objects based on the row lock indexes of the target write objects in the first graph data write request;
locking the target write objects in the first graph data write request based on the locking sequence; and
recording locked row lock information in a write request record, wherein the locked row lock information comprises at least a row lock index of a row lock.

17. The apparatus according to claim 16, wherein the locking the target write objects in the first graph data write request based on the locking sequence comprises:
iteratively performing the following locking process for the first graph data write request until the target write objects are locked or the first graph data write request is put in a row lock wait list:
sequentially extracting a target write object not currently locked from the first graph data write request based on the locking sequence;
querying, for the target write object not currently locked based on the row lock index of the target write object, whether a corresponding row lock exists in a latch that comprises the row lock index; and
creating a row lock for the target write object not currently locked in the latch that comprises the row lock index when the corresponding row lock does not exist in the latch that comprises the row lock index; or
putting the first graph data write request in a row lock wait list of the row lock when the corresponding row lock exists in the latch that comprises the row lock index.

18. The apparatus according to claim 16, wherein the unlocking the row locks held by the first graph data write request after graph data of the target write objects in the first graph data write request is written comprises:
iteratively performing the following unlocking process for the first graph data write request until all the row locks held by the first graph data write request are unlocked:
extracting unlocked row lock information from the write request record of the first graph data write request;
querying, based on a row lock index in the unlocked row lock information, whether a graph data write request to be written exists in a corresponding row lock wait list; and
transferring an ownership of a row lock corresponding to the row lock index to a second graph data write request located at a head of the row lock wait list when the graph data write request to be written exists in the row lock wait list; or
deleting the row lock corresponding to the row lock index from a latch that comprises the row lock index when the second graph data write request to be written does not exist in the row lock wait list.

19. The apparatus according to claim 18, wherein the operations further comprise:
triggering an asynchronous retry of the second graph data write request to perform graph data write for the second graph data write request.

20. The apparatus according to claim 19, wherein the operations further comprise:
accessing a row lock wait list that comprises the second graph data write request in response to that the asynchronous retry of the second graph data write request is triggered, to determine whether a third graph data write request that can be combined for processing exists in the row lock wait list; and combining the second graph data write request and the third graph data write request into a new graph data write request to write graph data when the third graph data write request that can be combined for processing exists in the row lock wait list.

\* \* \* \* \*